United States Patent Office 3,816,416
Patented June 11, 1974

---

3,816,416
α,ω-DI-s-TRIAZINYL PERFLUOROOXAALKANES
Thomas S. Croft, St. Paul, and Joseph La Mar Zollinger, Maplewood, Minn., assignors to Minnesota Mining and Manufacturing Company, St. Paul, Minn.
No Drawing. Filed Jan. 21, 1971, Ser. No. 108,624
Int. Cl. C07d 55/50
U.S. Cl. 260—248 CS          9 Claims

ABSTRACT OF THE DISCLOSURE

α,ω-Di-s-triazinyl n-perfluorooxaalkanes, useful as hydraulic fluids or lubricants, of the formula:

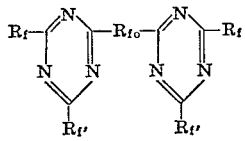

where $R_f$ and $R_{f'}$ are perfluorinated organic radicals and $R_{fo}$ is a straight chain (or normal) perfluoroalkyleneoxy-alkylene radical, are prepared by condensation between precursor perfluoroalkyl amidine and perfluoroalkylene-oxy-alkylene dinitriles and cyclodehydration of the resulting perfluoro di-imidoylamidine with a precursor perfluoroalkanoic or oxyalkanoic anhydride.

---

This invention relates to α,ω-di-s-triazinyl perfluorooxaalkanes and their preparation.

The advent of new higher performance aerospace systems has generated a demand for hydraulic fluids and lubricants which are capable of withstanding the increasing thermal and oxidative stress conditions without undergoing appreciable degradation (see Chemistry and Industry, Feb. 7, 1970, pages 178–179). This stability must be accompanied by adequate low temperature fluid properties and satisfactory lubricating characteristics. One or more of these important properties are lacking in currently available materials such as super-refined mineral oils, diesters, and polyphenylethers. Certain fluorocarbon materials, including those containing an s-triazine nucleus, have oxidative and thermal stability and have also been considered to meet such demand, but they generally exhibit relatively high temperature coefficients of viscosity—that is, they exhibit a relatively large change in viscosity with a change in temperature—as well as having relatively high pour points and high viscosities at low temperatures, i.e. below 0° F.

In connection with fluorocarbon compounds related to those of the instant invention, reference is made to U.S. Pats. 3,086,946, 3,453,275, German Pat. 1,953,857, and J. Org. Chem. 32, 603 (1967).

The novel α,ω-di-s-triazinyl n-perfluorooxaalkanes of this invention are normally liquid compounds and can be characterized by the general formula

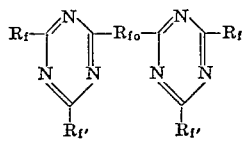

I

In said formula I, $R_f$ is a monovalent fluorinated saturated aliphatic radical containing at least one carbon atom which is bonded to a carbon of the triazine nucleus. Where said radical contains a plurality of carbon atoms in a skeletal chain, such chain may be branched or cyclic but preferably is a straight chain. Said skeletal chain of carbon atoms can be interrupted by divalent hetero atoms or radicals, such as divalent oxygen or sulfur, or trivalent nitrogen atoms, each of which is bonded only to carbon atoms, but preferably where such hetero moieties are present, such skeletal chain does not contain more than one said hetero moiety for every two carbon atoms. An occasional carbon-bonded hydrogen atom, bromine atom, or chlorine atom may be present, though they adversely affect thermal and/or oxidative stability of the compound; where present, however, they preferably are present not more than once for every two carbon atoms. Thus, for high thermal and oxidative stability, the non-skeletal valence bonds are preferably carbon-to-fluorine bonds, that is, $R_f$ is preferably perfluorinated. The total number of carbon atoms in $R_f$ can vary and be, for example, up to 50, but preferably is from 1 to 18, more preferably 1 to 8. Where $R_f$ is or contains a cyclic structure, such structure preferably has 5 or 6 ring members, 1 or 2 of which can be said hetero atoms, e.g. oxygen, sulfur, and/or nitrogen. The radical, $R_f$, is also one which is free of ethylenic or other carbon-to-carbon unsaturation, that is, it is a saturated aliphatic, cycloaliphatic, or heterocyclic radical. Examples of $R_f$ radicals are fluorinated alkyl, e.g. $CF_3$—, alkoxyalkyl, e.g., $CF_3OCF_2$—, and alkoxymono (or poly) alkyleneoxyalkyl, e.g., $CF_3OCF_2OCF_2$, said radicals being preferably perfluorinated, straight-chain aliphatic radicals consisting only of carbon and fluorine atoms.

$R_{f'}$ in said formula I can be the same as $R_f$ but preferably is a perfluoroalkyl or perfluoroalkoxyalkyl radical having 1 to 8 carbon atoms and derived from a perfluoroalkanoic or perfluoroalkoxyalkanoic acid.

The various $R_f$ and $R_{f'}$ radicals of formula I can be all the same or can be different.

$R_{fo}$ in said formula I is a divalent straight chain (or normal) alkyleneoxyalkylene radical having at least 3 carbon atoms, and preferably the formula

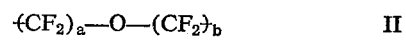   II where $a$ and $b$ are integers of 1 to 8, preferably 1 or 2, the sum $a+b$ being at least 3, or $R_{fo}$ is a divalent straight chain poly(alkyleneoxyalkylene) radical with at least 2 carbon atoms between oxygen atoms, and preferably the formula

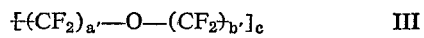   III where $a'$ and $b'$ are integers of 1 to 8, preferably 1 or 2, and $c$ is an integer of 2 to 100, preferably 2 to 10. Where $R_{fo}$ has said formula II, one or more of the $R_f$ and $R_{f'}$ monovalent triazine ring substituents preferably contains one or more ether oxygen atoms.

The compounds of formula I have a carbon-to-oxygen atom ratio of less than 50 to 1, preferably less than 6 to 1. The molecular weights of said compounds will generally be up to 6,000 and where said compounds are used as hydraulic fluids or lubricants, where low volatility is important, the molecular weights will preferably be at least about 2,000. Where such low volatility is not important, for example where the compounds are to be used as dielectric fluids or the like, molecular weights as low as 400 will be acceptable.

The di-triazinyl perfluorooxalkanes of formula I, in addition to being chemically inert and having desirably high thermal and oxidative stability and relatively low flammability, have relatively low temperature coefficients of viscosity, that is, they exhibit relatively little change in viscosity with change in temperature, and have a broad liquid range, that is, a low pour point combined with a high boiling point. These properties make the di-triazinyl perfluorooxaalkanes particularly useful as lubricants, hydraulic fluids, and heat transfer fluids under severe service conditions, such as those encountered by supersonic aircraft. They also are useful as dielectric fluids and can be used in precision instruments such as gyroscopes and dashpots.

As mentioned above, the di-triazinyl perfluorooxaalkanes (I) exhibit relatively low changes in viscosity with temperature. This property can be best measured by following Standard 533–43 of the American Petroleum Institute, frequently called the "ASTM slope." This slope is the tangent of the acute angle of the viscosity-temperature plot of the liquid under test on the ASTM Standard Chart D 341–43. The smaller the ASTM slope, the flatter the plotted curve and the lower the change in viscosity with temperature. The ASTM slopes of the di-triazinyl perfluorooxaalkanes of this invention are generally 1.0 and lower. These desirably low ASTM slopes for these compounds are coupled with high boiling points (i.e., low volatility), low pour points, and lower viscosities at given temperatures.

The di-triazinyl perfluorooxaalkanes of formula I can be prepared by the condensation of a fluorinated amidine (II) with a perfluoroalkyleneoxaalkylene dinitrile (III) to form an intermediate di-imidoylamidine (IV), followed by cyclodehydration of the latter with a fluorinated anhydride (V), as illustrated by the following series of equations:

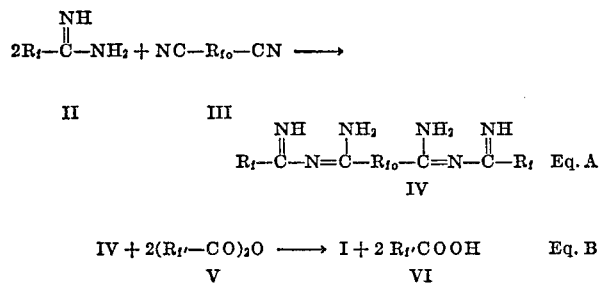

The amidine (II) can be prepared from a corresponding mono-nitrile, $R_fCN$, by treating the latter with an excess of ammonia, for example at $-40°$ C. and removing the unreacted ammonia, said mono-nitriles and said conversion procedure being known (e.g., see U.S. Pats. 2,567,001, 2,676,985, 3,696,002, and 3,470,176). The condensation of the amidine (II) with the di-nitrile (III), which is also a known compound (e.g., see J. Org. Chem. 35 2816 (1970), J. Macromol Sci.-Chem., A 3(7) 1443 (1969), and U.S. Pats. 3,347,901 and 3,470,176), can be carried out by following the known procedure for making imidoylamidines (e.g. see U.S. Pat. 3,489,727), for example in an inert solvent at low temperature, e.g. $-40°$ C. to $+25°$ C. The resulting di-imidoylamidine (IV) can then be cyclodehydrated, for example at 0 to 30° C., with the anhydride (V) (e.g. see Rubber Chem. and Tech. 39 1175 (1966)). The di-triazinyl perfluorooxaalkane product (I) can be recovered from the resulting reaction product mixture by distillation or by any other suitable recovery technique. For example, the product can be recovered by distillation after first distilling off the solvent and the by-product acid, $R_{f'}CO_2H$, and any other low boiling by-products which may result from incomplete condensation.

Objects and advantages of this invention are illustrated in the following examples, but the various materials and amounts thereof recited in these examples, as well as various conditions and other details, should not be construed to unduly limit this invention.

EXAMPLES

Excess ammonia was condensed with 14.5 g. (0.055 moles) of perfluoro(ethoxy propionitrile), $$C_2F_5OC_2F_4CN$$

at liquid nitrogen temperature. This mixture was stirred at $-40°$ C. for 2 hrs. and allowed to warm to ambient temperature at which time the excess ammonia was removed under vacuum. Dry 1,1,2-trichlorotrifluoroethane (Freon 113) was added to the resulting amidine, $$C_2F_5OC_2F_4C(NH)NH_2$$

and the solution cooled to $-40°$ C. A rapid addition of 23 g. (0.025 moles) of tetramer dinitrile, $$NC(CF_2CF_2OCF_2CF_2)_4CN$$

in Freon 113 gave the intermediate di-imidoylamidine, $$[-(CF_2CF_2OCF_2CF_2)_2C(NH_2)NC(NH)C_2F_4OC_2F_5]_2$$

The temperature was allowed to rise to ambient temperature and stirred overnight. The solution was then placed in a dropping funnel and slowly added dropwise to 46 g. (0.08 moles) of perfluoro(ethoxy propionic anhydride), $(C_2F_5OC_2F_4CO)_2O$, in Freon 113 at 0° C. After stirring overnight, a shortpath distillation at reduced pressure yielded 28 g. of 1,20-di[3,5(3-oxanonylfluoropentyl)-2,4,6-triazinyl] 3,8,13,18-tetraoxadotriaconylfluoroeicosane, B.P.=195–205° C./1 mm., whose structure was confirmed by elemental, infrared spectroscopic, and nuclear magnetic resonance analyses. This compound and the preparation thereof are hereinafter referred to as Example 1.

Following the procedure of Example 1, various fluorinated mono-nitriles, dinitriles, and anhydrides were used to prepare other di-triazinyl perfluorooxaalkanes of said formula I, these further compounds and their preparation hereinafter referred to as Examples 2–12. Examples 1–12 are summarized in Table I below, and Table II below summarizes various properties of such compounds. The kinematic viscosities were measured (in accordance with ASTM D 445–65) with a Cannon-Manning Semi-Micro Viscometer with a temperature bath controlled to within 0.2° C. The ASTM slopes were determined by plotting viscosities as a function of temperature on a Standard Viscosity ASTM Chart (see ASTM D–341–43, approved 1968), and measuring the slope from a straight line drawn between viscosities at 100° F. and 210° F. The thermogravimetric analysis (TGA) spectra were obtained with a 20° C./min. rate of rise under a static atmosphere of air with a bell jar pressure adjusted to 730–740 mm. Pour points were measured in accordance with ASTM D97–66.

TABLE I[1]

| Ex. | R_f in R_fCN and product | a in NC(CF₂CF₂OCF₂CF₂)_aCN | R_f in (R_f'CO)₂O and product | C/O atom ratio in product | Yield[2] of product, weight percent |
|---|---|---|---|---|---|
| 1 | C₂F₅OC₂F₄— | 4 | C₂F₅OC₂F₄— | 4.8/1 | 50 |
| 2 | n-C₅F₁₁— | 4 | n-C₅F₁₁— | 10.5/1 | 66 |
| 3 | C₂F₅OC₂F₄— | 2 | C₂F₅OC₂F₄— | 5/1 | 53 |
| 4 | n-C₅F₁₁— | 2 | n-C₅F₁₁— | 17/1 | 51 |
| 5 | n-C₇F₁₅— | 2 | n-C₇F₁₅— | 21/1 | 68 |
| 6 | C₂F₅OC₂F₄— | 1 | C₂F₅OC₂F₄— | 5.2/1 | 61 |
| 7 | n-C₅F₁₁— | 1 | n-C₅F₁₁— | 30/1 | 61 |
| 8 | C₃F₇O(CFCF₂O)₂CF— with CF₃ branches | 2 | n-C₃F₇— | 5.2/1 | 79 |
| 9 | C₃F₇O(CFCF₂O)₂CF— with CF₃ branches | 2 | CF₃— | 4.4/1 | 56 |
| 10 | C₃F₇O(CFCF₂O)₄CF— with CF₃ branches | ([3]) | CF₃— | 3.8/1 | 17 |
| 11 | cyclic CF₂-CF₂-O-CF₂-CF₂-N-CF₂CF₂— | 2 | n-C₇F₁₅— | 10/1 | 60 |
| 12 | cyclic with CF₂-CF₂ and CF₂ bridges, CF₂— | 2 | C₂F₅OC₂F₄— | 8.5/1 | 70 |

[1] "Product" referred to in Table I is di-triazinyl perfluorooxaalkane of formula I, supra.
[2] Yield values given are those for di-triazinyl perfluorooxaalkane product based on weight of dinitrile reactant used
[3] The dinitrile used in Example 10 was NCCF₂OCF₂CF₂OCF₂CN.

TABLE II

| Ex. | Kinematic viscosity, cs., at 32° F. | 100° F. | 210° F. | ASTM slope | Pour point, °F. | TGA temp. (°C.) at indicated wt. loss 10% wt. | 50% wt. | 100% wt. |
|---|---|---|---|---|---|---|---|---|
| 1 | 191.3 | 16.8 | 4.0 | 0.70 | −47 | 230 | 270 | 290 |
| 2 | 668 | 58.3 | 6.4 | 0.80 | −32 | 298 | 347 | 372 |
| 3 | 94.9 | 9.8 | 2.8 | 0.73 | −50 | 190 | 230 | 250 |
| 4 | 566 | 44.3 | 4.9 | 0.87 | −30 | 274 | 320 | 342 |
| 5 | 2,372 | 109 | 7.2 | 0.89 | −2 | 303 | 352 | 327 |
| 6 | | | | | −65 | | | |
| 7 | 567 | 42.7 | 4.2 | 0.95 | −30 | 260 | 302 | 322 |
| 8 | 672 | 45.8 | 5.4 | 0.82 | −12 | | | |
| 9 | 1,108 | 69.1 | 6.8 | 0.83 | −17 | 246 | 289 | 317 |
| 10 | 846 | 58.4 | 6.6 | 0.78 | −13 | 249 | 293 | 318 |
| 11 | | 187 | 7.2 | 1.0 | −0.4 | 247 | 294 | 318 |
| 12 | | 55.0 | 4.8 | 0.90 | −22 | 220 | 259 | 280 |

The data of Table II show that the di-triazinyl perfluorooxaalkanes of this invention (Examples 1–12) have desirably low ASTM slopes and pour points, which properties together with their inherent thermal and oxidative stability make them especially useful as lubricants and hydraulic fluids over a wide temperature range. These desirable properties can be attributed in no small degree to the divalent oxygen in the compounds, as most significantly indicated by the comparison of Examples 1 or 3 with $(C_5F_{11})_2C_3N_3(CF_2)_8C_3N_3(C_5F_{11})_2$, the latter having an ASTM slope of 0.91, viscosities of 115 cs. at 100° F. and 7.2 cs. at 210° F., and a pour point of +1° F. Comparison of the di-triazinyl perfluorooxaalkane of Example 2 to that of Example 5, both having 42 carbon atoms, and comparison of that of Example 3 to Example 7, both having 30 carbon atoms, show those with the lower carbon-to-oxygen atom ratios, i.e. Examples 2 and 3, have superior ASTM slopes, pour points, and viscosities. Comparison of Examples 1, 3, and 9, all having comparable carbon-to-oxygen atom ratios, show that branching, i.e., pendant $CF_3$—, in the $R_f$-triazine ring substituent, raises the ASTM slope, pour point, and viscosity properties. Comparisons of the TGA data of Example 1 to Example 2, Example 3 to Example 4, Example 1 to Example 4, and Example 2 to Example 9, show volatility is increased if the monovalent triazine ring substituents contain ether oxygen. Thus, di-triazinyl perfluorooxaalkanes of this invention having low carbon-to-oxygen atom ratios, e.g. less than 10/1 and preferably less than 6/1, with straight chain triazine substituents, and monovalent triazine substituents consisting of only carbon and fluorine, give the best combination of properties.

Various modifications and alterations of this invention will become apparent to those skilled in the art without departing from the scope and spirit of this invention, and it should be understood that this invention is not to be unduly limited to the illustrative embodiment set forth herein.

We claim:

1. A compound of the formula

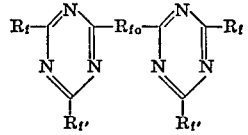

wherein said $R_f$ and $R_{f'}$ are straight chain perfluorinated alkyl, alkoxyalkyl, alkoxyalkyleneoxyalkyl, or alkylpoly(oxyalkylene)alkyl of 1 to 18 carbon atoms, and $R_{fo}$ is a straight chain perfluoro akyleneoxyalkylene radical of the formula $+(CF_2)_aO(CF_2)_b+$, where $a$ and $b$ are integers of 1 to 8, the sum $a+b$ being at least 3 or $R_{fo}$ is a straight chain perfluoro poly(alkyleneoxyalkylene) radical of the formula $+(CF_2)_{a'}O(CF_2)_{b'}+_c$, wherein $a'$ and $b'$ are integers of 1 to 8, and C is an integer of 2 to 100.

2. A compound according to claim 1 wherein $R_f$ and $R_{f'}$ are straight chain perfluorinated alkyl radicals having 1 to 18 carbon atoms and which can contain not more than one ether oxygen for every two carbon atoms.

3. A compound according to claim 1 wherein said $R_{fo}$ is said perfluoro alkyleneoxyalkylene radical and at least one of said $R_f$ and $R_{f'}$ contains ether oxygen.

4. A compound according to claim 1 wherein said $R_{fo}$ is said perfluoro poly(alkyleneoxyalkylene) radical and $R_f$ and $R_{f'}$ are straight chain perfluoroalkyl radicals of 1 to 18 carbon atoms.

5. A compound according to claim 4, wherein said compound has a carbon-to-oxygen atom ratio of less than 10 to 1.

6. A compound according to claim 4, wherein said compound has a carbon-to-oxygen atom ratio of less than 6 to 1.

7. A compound having the formula $$(C_2F_5OC_2F_4)_2C_3N_3(CF_2CF_2OCF_2CF_2)_4C_3N_3(C_2F_4OC_2F_5)_2$$

8. A compound having the formula $$(n\text{-}C_5F_{11})_2C_3N_3(CF_2CF_2OCF_2CF_2)_4C_3N_3(n\text{-}C_5F_{11})_2$$

9. A compound having the formula $$(C_2F_5OC_2F_4)_2C_3N_3(CF_2CF_2OCF_2CF_2)_2C_3N_3(C_2F_4OC_2F_5)_2$$

References Cited
UNITED STATES PATENTS

| | | | |
|---|---|---|---|
| 3,542,660 | 11/1970 | Grindahl et al. | 260—248 X |
| 3,566,835 | 3/1971 | Grindahl et al. | 260—248 |
| 3,708,483 | 1/1973 | Anderson et al. | 260—248 |

JOHN M. FORD, Primary Examiner

U.S. Cl. X.R.

252—78, 51